Nov. 25, 1969   W. D. TEAGUE, JR   3,479,831
METHOD AND SYSTEM FOR LAYING PIPE UNDER WATER
Filed Sept. 20, 1967                                    3 Sheets-Sheet 1

INVENTOR.
Walter Dorwin Teague, Jr.
BY
Curtis, Morris & Safford
ATTORNEYS

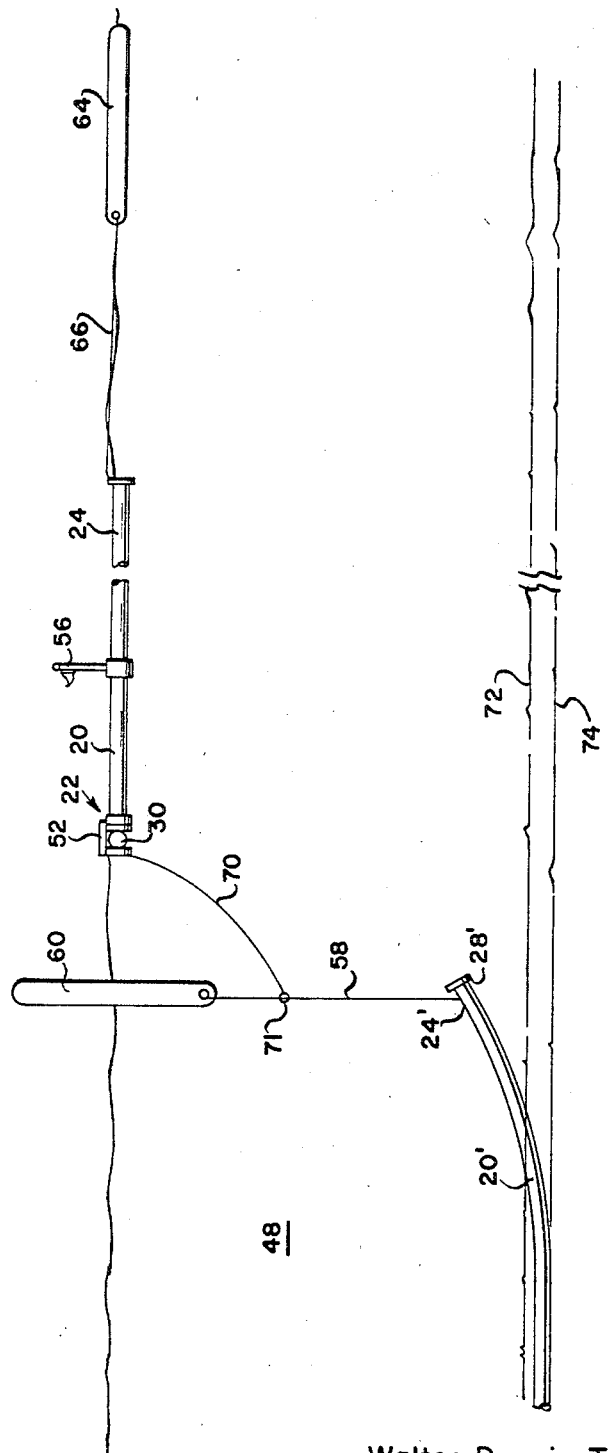

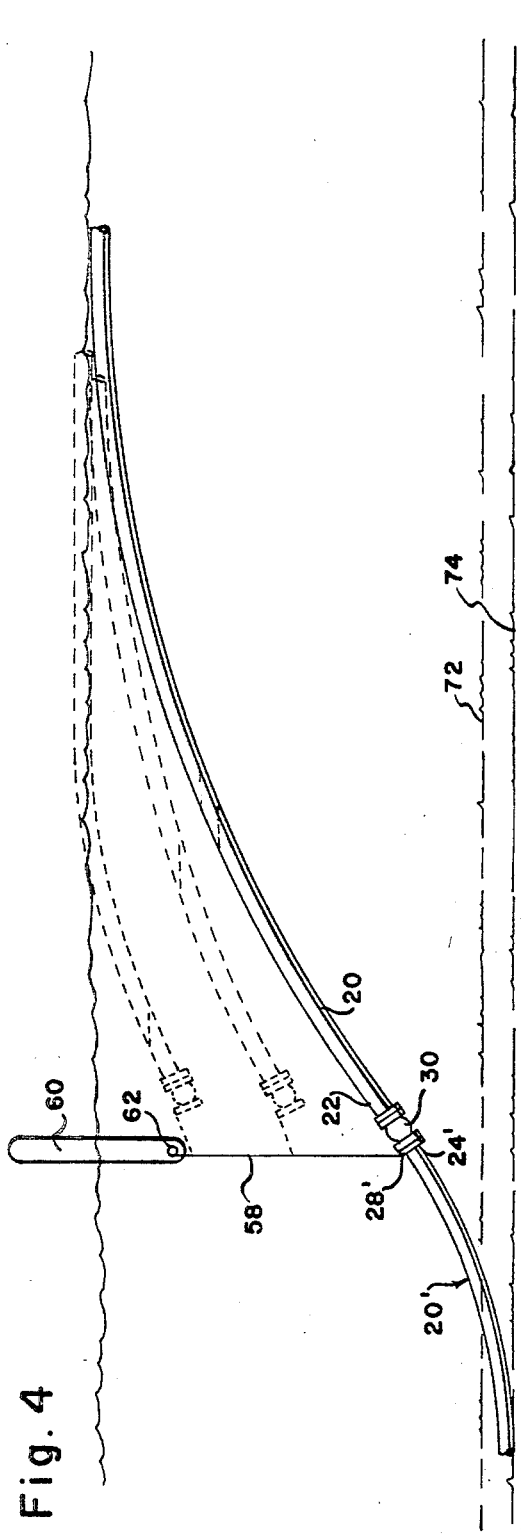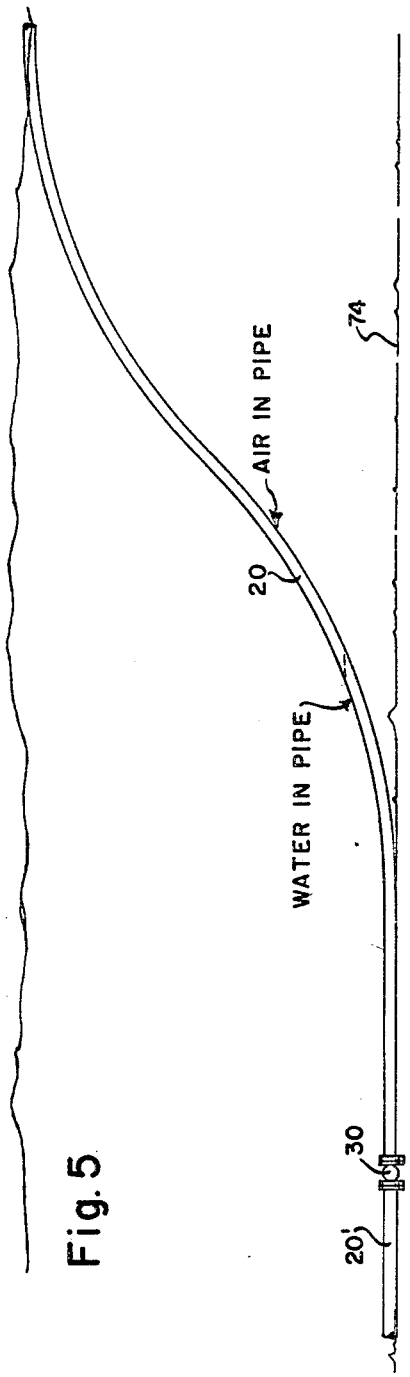

3,479,831
METHOD AND SYSTEM FOR LAYING PIPE
UNDER WATER
Walter Dorwin Teague, Jr., Nyack, N.Y., assignor to Columbia Gas System Service Corporation, New York, N.Y., a corporation of Delaware
Filed Sept. 20, 1967, Ser. No. 669,220
Int. Cl. B63b 35/04; F16l 1/00
U.S. Cl. 61—72.3                           11 Claims

ABSTRACT OF THE DISCLOSURE

A system is disclosed for laying pipeline under water, i.e., on the bottom of the ocean. The pipeline is assembled on shore into a long pipestring, e.g., four thousand feet, and coated with a corrosion resistant material, and a cement jacket is added to maintain a slight positive buoyancy in the assembled pipestring. The pipestring is then towed out to sea to the desired installation area, and one end is attached to the free end of an already laid and submerged pipeline. The pipestring is then progressively flooded at a predetermined rate to create a negative buoyancy thereby causing the pipestring to sink progressively and to drape along the ocean bottom.

---

The present invention relates to installing a large diameter pipeline in deep water, and more particularly to laying a large diameter pipestring of great length onto the ocean floor by controlling the buoyancy of the pipestring in the water to allow for a controlled progressive draping of the pipestring along the ocean floor.

Submerged pipeline systems are being used more extensively today due to a great increase in the number of off-shore oil and gas drilling installations and the concurrent necessity of having pipeline systems interconnecting widely dispersed off-shore drilling operations and collection and feeder lines to carry the oil and gas from the off-shore installations back to shore. These drilling operations are being carried out at greater distances from the shoreline and in more widely dispersed areas thus requiring undewater pipeline systems of greater and greater lengths.

Present methods of laying underwater pipelines utilizing lay-barges wherein the pipe sections in forty foot lengths are welded, coated and laid using a stinger extending from the rear of the lay-barge are a slow and tedious process requiring expensive equipment and long assembly time. Further, since the operation is carried out from barges on the surface of the water, any inclement weather or rough sea conditions forces suspension of the pipe laying operation.

Other methods have been proposed whereby long strings of pipeline are laid at one time by employing pontoons or other float devices to support the pipestring while it is towed out to the installation point and then separating the pontoons from the pipestring and allowing the string to sink to the bottom. These methods require complex pneumatic and/or electrical controls to release the pontoons and thus, the control mechanisms are subjected to the forces of wave action and exposure to adverse weather conditions. Consequently, there is the problem and expense of continual checking, maintenance and replacement of these control devices. Further, these methods do not provide an adequate system for connecting the pipestring to previously laid pipe with any degree of facility or ease of operation.

It is therefore an object of the present invention to provide a method for laying a long pipestring along a submerged bottom.

It is a further object of this invention to provide a method for laying a long pipestring on a submerged bottom by draping the pipestring along the bottom by a controlled balance of the buoyant forces acting on the pipestring.

A still further object of the present invention is to provide a method for laying a long pipestring on a submerged bottom wherein provision is made for readily connecting the pipestring to previously laid pipeline laying submerged on the bottom.

Yet another object of the present invention is to provide a method for laying a submerged pipeline requiring a minimum expenditure for equipment and operation.

Still another object of the present invention is to provide a method for laying a long string pipeline wherein a number of long strings of the pipe may be assembled and tested at a shore installation and then towed out to the installation area to be rapidly laid thus obviating many of the delays resulting from inclement weather and sea conditions.

According to the preferred embodiment of the invention, standard forty foot lengths of tubular pipe material having a thirty inch nominal outside diameter and a one-half inch wall thickness are welded at a shore installation in a long string, i.e., four thousand feet or more in length. The welds are X-rayed to insure sound joints between the pipe sections; and, the string is then weight coated with a coating suitable for preventing corrosion, and a cement jacket is added to lower the inherent buoyancy of the string to two percent positive buoyancy. Adjustment in the buoyancy can then be made by adding concrete patches at selected points or, conversely, foam plastic patches to bring the buoyancy of the string to the desired two percent positive buoyancy. The open ends of the string are sealed with removable plugs and the string is then towed out to the desired installation area. At this point, the adjacent end of the string is attached to the free end of the pipeline already laid and fully submerged. After connection, the string is allowed to flood in a controlled progressive manner to provide enough negative buoyancy to allow the pipestring to drape along the submerged bottom surface. Once the string is fully submerged the end plugs are removed and the process is repeated with a new pipestring.

These and other objects and advantages of the present invention can best be understood and appreciated by reference to the accompanying drawings and description.

In the drawing, in which an illustrative embodiment of the present invention is shown somewhat schematically:

FIGURE 3 is a schematic representation of the pipestring in position over the free end of an already laid pipe;

FIGURE 4 is a schematic representation of the steps followed in joining the laid section with the new pipestring; and FIGURE 5 is a diagrammatic elevation of the pipestring after the new section has been connected, showing the process of draping.

Figure 1:
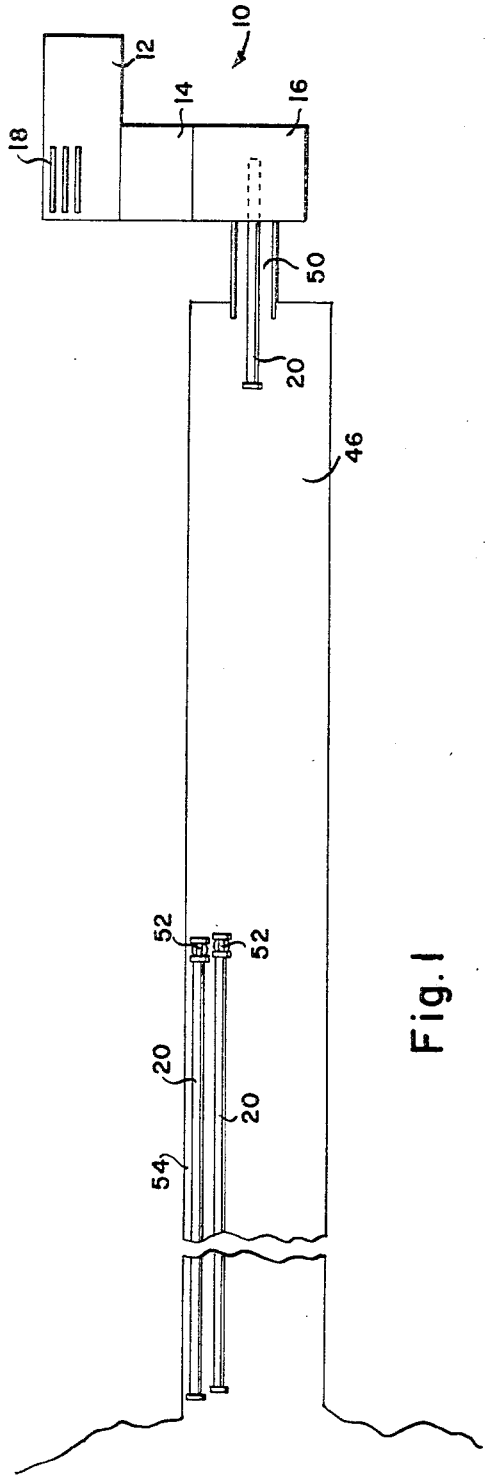
FIGURE 1 is a diagrammatic representation of the assembly yard and launching canal.

A pipe assembly yard 10 has a pipe storage yard 12, a coating yard 14 and a welding and X-ray shop 16. Pipe sections 18 are of standard type used for oil or gas lines, for example thirty-inch pipe and half inch walls, in forty-foot lengths. The sections 18 are moved from storage yard 12 to coating yard 14, where they are treated with a corrosive resistant coating and then jacketed with a cement layer. The thickness of the cement layer is such that if the ends of the section are plugged, it would have a slight positive buoyancy, for example of the magnitude of 1.01 to 1.10 but preferably 1.02. As an illustration, the cement coating of the thirty-inch pipe mentioned above might raise the weight per foot of the pipe to 313 pounds from 156 pounds. Appropriate patches, i.e., cement or plastic foam, are added to adjust the buoyancy to the desired level.

The coated and jacketed sections 18 are moved to welding and X-ray shop 16, where they are assembled into a pipestring 20. Each section 18 is welded onto the end of another. After the weld is inspected by X-ray, it is treated with a corrosive resistant coating and jacketed with a cement layer.

Figure 2:
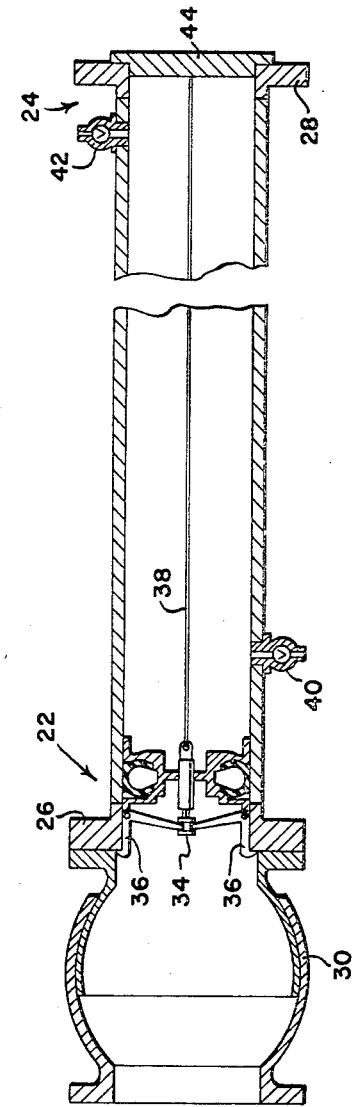
FIGURE 2 is a cross section of a pipestring, with its middle section omitted.

Pipestring 20, referring to FIGURE 2, when assembled comprises a long tubular center portion of the magnitude of a hundred sections and end sections 22 and 24. Each end section has a flange element 26 and 28, respectively, welded to the terminal portion of pipestring 20 to provide a connection surface and a universal joint connection 30 is secured to flange 26 on end 22. End 22 also includes a removable plug 34 with pivoting retaining pawls 36 and a releasing cable 38 attached to plug 34 and extending the length of the pipestring 20. When line 38 is pulled, plug 34 is removed through the pipestring 20. A remotely operable water inlet valve 40 allows for controlled flooding of end 22 upon command.

Each end section 24 comprises flange 28, an air release valve 42, a removable bulkhead 44 and a suitable line attaching means (not shown) to enable the pipestring 20 to be towed in the water.

Referring again to FIGURE 1, the weld shop 16 is placed at the end of a canal 46. The canal is straight and at least a mile long, and it opens into open water 48. The string 20 is assembled in shop 16 starting with a finished end section then adding additional sections 18. As the string 20 grows in length, it is fed down a slipway 50 into canal 46. The angle of incline of slipway 50 is small in relation to the floor of shop 16 and to the water in the canal, so that the string 20 is put under no serious stress. When the desired length string has been assembled the opposite completed end section from the far end is added, and the pipestring is moved fully into the canal 46. For example, the first section might be end 24 with bulkhead 44 in place and the last, end section 22 with the universal connection 30 so that end 24 is facing down the canal 46.

When the string has been moved completely into the canal 46, it is tested for buoyancy and physical integrity, and any adjustment in buoyancy is made by adding concrete or foam patches as needed. A removable buoyant float 52 is added to the universal connection 30 to compensate for the high negative buoyancy of this connection. The string can then be stored in the canal along one shore or in a special area 54.

The pipestrings 20 remain in storage area 54 until they are needed in the installation area, which is in the large body of water 48. A small boat, such as a tugboat, attaches itself to one end of the pipestring 20, preferably end 24, and tows it into position for installation.

During towing the pipestring 20 is low in the water because of its low buoyancy, so that it is not subjected to intense stresses from wind and waves. Because it is low in the water and of the magnitude of 4000 feet long, string 20 is fitted with warning markers, such as a strobascopic light assembly 56, shown in FIGURE 3.

Referring to FIGURE 3, the string 20 is shown ready for installation, positioned in correct relationship to an already laid pipestring 20', over its free end 24'. The adjacent end 22 of the pipestring 20 is positioned nearly above free end 24' of string 20', with strings 20 and 20' generally parallel and leading in opposite directions. The free end 24' is connected by a line 58 to a spar buoy 60 that is a type unaffected by superficial disturbances of the water 48. A reel 62 on spar buoy 60 can change the length of line 58.

As pipestring 20 reaches its position parallel to, above and adjacent pipe 20', a boat approaches the end 24, which is distant from pipe 20', to help slow the string and to attach it to a spar buoy 64 by a line 66. The line 66 is connected to the buoy by a reel 68 in an arrangement similar to that of buoy 60 and line 58. Adjacent end 22 is attached to a line 70, that is slidably mounted on line 58 by a clip 71. Small boats and light anchors might assist in keeping the pipe 20 from drifting while it is in position.

To attach free end 24' with adjacent end 22 the float 52 is removed from universal connection 30, the valve 40 at adjacent end 22 is opened to allow water to enter pipe 20 at a predetermined rate, and the valve 42 is opened at distant end 24 to allow air to escape from the pipe 20. As the adjacent end 22 fills with water and sinks, line 70 is shortened until the adjacent end 22 can be directly shackled to line 58.

Referring to FIGURE 4, the adjacent end 22 of the pipe 20 has travelled down line 58 until it has reached the same depth as free end 24' of line 20'. At this point, with free end 24' of pipeline 20' and its connecting flange 28' opposite adjacent end 22 and the universal connection 30, the valves 40 and 42 are closed so that pipestring 20 sinks no farther.

In order for the two ends to fit together, they have to be substantialy coaxial, though the universal connection 30 allows enough tolerance so that a small deviation of axes is possible. Further, the free end 24' and adjacent end 22 have to meet above floor mud 72 that lies on bottom 74, so that equipment does not foul and so that divers can see and move freely. Holding the free end 24' off the bottom 74 by line 58 is necessary to meet both of these requirements. Exact governing of the height of the free end 24' from the bottom 74 is necessary so that the tolerance of pipe 20' to bending will not be exceeded and so that the angle the axis of the free end 24' makes with the horizontal can be exactly governed. The cable 58 can be shortened or lengthened according to need by actuating the reel 62 in the spar buoy 60. Steady holding by the buoy can be relied upon because of its immunity to surface disturbance.

The elevation of the free end 24' above the horizontal is calculated to be equal to the angle at which the adjacent end 22 drops. The angle of drop of adjacent end 22 depends upon the initial buoyancy of the string 20. The greater the positive buoyancy, the greater the angle of drop. By regulating the buoyancy of the individual pipe sections 18 when they receive their cement coating in the yard 10 another control variable is provided to insure that the angle of elevation of the laid pipe 20' is the same as the angle of drop of the new pipestring 20. Thus where the various depths encountered at the installation area dictate, the mating angle of the two sections may be adjusted by precalculating the angle of elevation and then controlling the buoyancy of the mating string 20 to insure that the angle of drop will be equal to the angle of elevation to be encountered at the installation area. Thus, different depths at the installation area may dictate different buoyancies for the pipestring being installed.

With the angle of drop of the adjacent end 22 substantially equal to the angle that free end 24' is lifted to, the universal connection 30 can be joined to the connecting flange 28' thus making pipe 20' and pipestring 20 a single pipeline. The actual coupling is easily done by divers who are working in relatively clear water and with powertools.

When the joint is properly made, the pipe 20 is draped along the bottom. Valves 40 and 42 are reopened to allow water to enter at a predetermined rate and the cable 58 is lengthened and eventually released. As the water flows into the new string, it overcomes the positive buoyancy of the pipestring and the pipestring now, due to the negative buoyancy, progressively drapes itself along the bottom surface 74. If desired, or if conditions warrant, a tension force can be applied to distant end 24 by a boat (not shown) to keep the pipestring in a steady position. Due to the near neutral buoyancy of the pipestring 20, the draping curve assumed by the pipe (see FIGURE 5) will never reach a condition exceeding the maximum stress which the pipestring 20 can withstand regardless of the depth, providing that the rate of admission of water through water inlet valve 40 is controlled to preclude undesirable dynamic effects.

When the string has been fully filled with water and completely submerged, the universal connection 30 is made rigid and secure, the bulkhead 44 at the new free end, formerly distant end 24, is removed and the plug 34 at the adjacent end 22 is disengaged and pulled through the pipestring by means of the stainless steel cable 38 attached to the plug.

The spar buoy 64 remains attached to the new free end 24 by line 66. The length of line 66 can be adjusted so that new free end 24 does not drop completely to the bottom but stays slightly elevated, as free end 24' is in FIGURE 3. The new free end 24 may be allowed to settle onto bottom surface 74, from where it can be raised by activating reel 68 in buoy 64.

The pipeline, now flooded with water, will remain on the bottom surface as the flooded pipeline has enough negative buoyancy to keep it stationary. Before the water in the line is pumped out suitable anchorage must be provided, e.g., by trenching, using underwater trenching devices, and/or adding further concrete weights or any other suitable anchoring devices.

It is thus apparent that the present invention provides a relatively simple method for rapidly laying long submerged pipelines. By utilizing the inherent buoyancy of the pipestring itself and controlling the weight coating to provide a slight positive buoyancy the pipestring may be deployed using only small surface craft. Further, the pipe laying process may be carried out almost continuously without regard to rough sea conditions for when seas are too rough for laying operations the pipestrings can be assembled in the short installations and stored. Then when sea conditions permit the prepared pipestring can be towed to the installation area and rapidly laid in one continuing operation. Since very little physical and visual control is necessary the laying operations may be carried out at night.

Further, with the overall plan of the pipeline system designed in accordance with the bottom conditions at the installation areas, the prepared lengths may be varied to avoid making connections at sharp chasms or crevices. Also appropriate T-connections for feeder lines may be added at desired intervals in the pipestring to allow for the connection of feeder and trunk lines.

What is claimed is:

1. A method for laying a pipeline on a submerged bottom wherein a relatively long pipestring is joined to a free end of a section of submerged pipeline already in position on the bottom comprising:
   imparting a slight positive buoyancy to the pipestring to be laid;
   floating said buoyant pipestring on a body of water to the installation area;
   locating and elevating the free end of the submerged pipeline above the bottom surface;
   imparting a negative buoyancy to an adjacent end of the piperstring to be laid to thereby cause said adjacent end to partially sink to a point near said free end of the submerged pipeline;
   joining said adjacent end of the pipestring to be laid to said free end of the submerged pipeline while maintaining said free end in its elevated position; and
   imparting a negative buoyancy to said pipestring progressively from said adjacent end to its free end at a controlled rate to thereby create a progressively advancing negative buoyancy in the pipestring to cause said pipeline to return to said bottom surface and said pipestring to sink and drape itself along the bottom surface progressively from its said adjacent end to its said free end.

2. The method of claim 1 wherein the negative buoyancy is imparted to said pipestring by flooding said adjacent end.

3. The method of claim 1 wherein the positive buoyancy of the pipestring is maintained by sealing each end to prevent entry of water into the pipestring and by applying a controlled layer of corrosive resistant material and weight coating to the exterior of the pipestring to achieve a controlled positive buoyancy so that the pipestring floats freely in the water.

4. The method of claim 3 wherein the positive buoyancy is of the order of 1% to 10%.

5. The method of claim 3 wherein the positive buoyancy is maintained at substantially 2%.

6. The method of claim 2 wherein said free end of said submerged pipeline is positioned so that its axis forms an acute angle to the horizontal, and the axis of said adjacent end of the pipestring to be laid is at substantially the same angle to the horizontal when said adjacent end has been partiaclly sunk to a position near said free end of the submerged pipeline.

7. The method of claim 6 wherein the buoyancy of said pipestring is controlled such that when said negative buoyancy is imparted to said end to be joined the angle said pipestring makes with the horizontal is approximately equal to a precalculated angle of elevation for the free end of said submerged pipeline.

8. The method of claim 1 wherein the step of locating said free end includes raising said free end by imparting substantial positive buoyancy thereto.

9. The method of claim 8 wherein the negative buoyancy is imparted to said adjacent end of said pipestring by flooding said adjacent end at a controlled rate.

10. In a method for laying a pipeline in a body of water as an extension to the free end of a submerged pipeline the steps of:
   assembling a pipestring from shorter sections of pipe at a shore installation;
   sealing the interior of said assembled pipestring to make said interior substantially fluid tight;
   coating said assembled pipestring with a controlled layer of coating material whereby the inherent positive buoyancy of the assembled pipestring is of the order of a slight positive buoyancy such that said pipestring floats low in water, the order in which said coating step has to the other of said steps having no significance;
   thereafter floating said buoyant pipestring on a body of water to the desired installation area;
   locating and elevating said free end of the submerged pipeline so that the axis of said free end forms an acute angle with respect to the horizontal;
   imparting a negative buoyancy to the adjacent end of said pipestring to thereby cause said adjacent end to sink to a position wherein the axes of said ends are substantially in alignment;
   joining said ends while maintaining said free end substantially at said acute angle; and
   imparting a negative buoyancy to said pipestring progressively from said adjacent end to said free end at a controlled rate to thereby cause said pipeline to return from its elevated position and said pipestring to progressively sink and drape itself to the desired submerged position.

11. The method of claim 9 wherein said negative buoyancy is imparted to said pipestring by flooding said pipestring at a controlled rate.

References Cited

UNITED STATES PATENTS

| | | | |
|---|---|---|---|
| RE. 23,963 | 3/1955 | Collins | 61—72.4 |
| 1,220,189 | 3/1917 | Chapman | 61—72.3 |
| 3,136,133 | 6/1964 | Perret | 61—72.3 |
| 3,262,275 | 7/1966 | Perret | 61—72.3 |
| 3,273,346 | 9/1966 | Delaruelle et al. | 61—72.3 |
| 3,307,627 | 3/1967 | Shatto | 61—72.3 X |
| 3,321,925 | 5/1967 | Shaw | 61—72.3 |

JACOB SHAPIRO, Primary Examiner